Feb. 23, 1943.　　　A. R. THOMAS　　　2,311,710
HEATING SYSTEM
Filed Aug. 3, 1940

INVENTOR.
Albert R. Thomas
BY
E. Fernander
his ATTORNEY

Patented Feb. 23, 1943

2,311,710

UNITED STATES PATENT OFFICE 2,311,710

HEATING SYSTEM

Albert R. Thomas, Evansville, Ind., assignor to Servel, Inc., New York, N. Y., a corporation of Delaware Application August 3, 1940, Serial No. 350,241

12 Claims. (Cl. 237—9)

This invention relates to heating systems, and is particularly concerned with a heating system of an open type which operates at atmospheric pressure.

It is an object of this invention to supply steam from a boiler to a radiator or heating element having a vent to atmosphere, and to control the supply of steam so that, at heat inputs less than a predetermined maximum to the boiler, a varying quantity of air can enter the interior of the heating element to form an air blanket about portions of the heating element. By controlling the rate of flow of steam to the heating element, more or less of the heat dissipating surface thereof can be blanketed off with air and kept out of direct contact with the steam, so that the effective surface area heated by the steam can be varied to effect regulation of the heating effected by the heating element.

It is another object of the invention to provide a plurality of burners to supply heat to a steam boiler of a heating system, and to sequentially control the burners, and hence the quantity of steam delivered to a heating element of the heating system, responsive to a temperature condition affected by the heating element.

It is a further object of the invention to provide an improvement for controlling the heat supply to a steam boiler associated with a heating element having a vent to atmosphere, whereby the supply of steam to the heating element is reduced when steam passes into the atmosphere through the vent.

Figure 2:
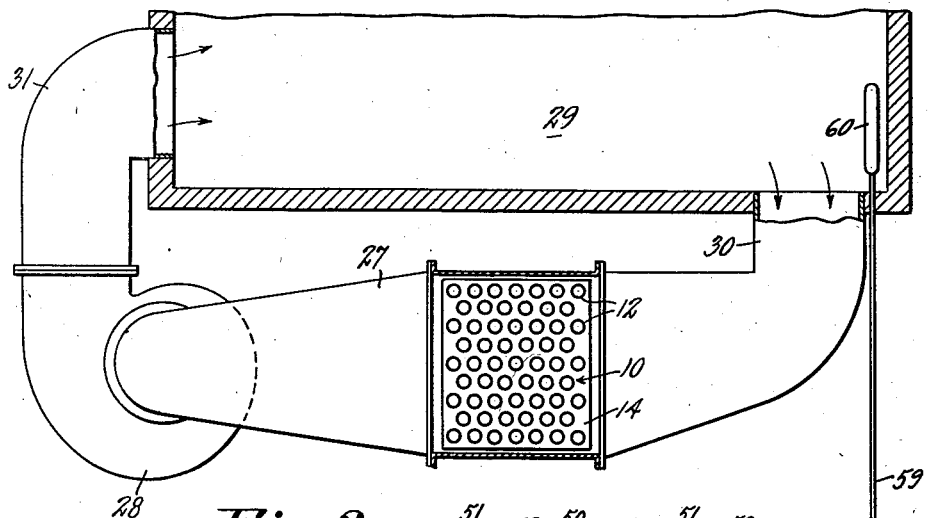
Figure 1:
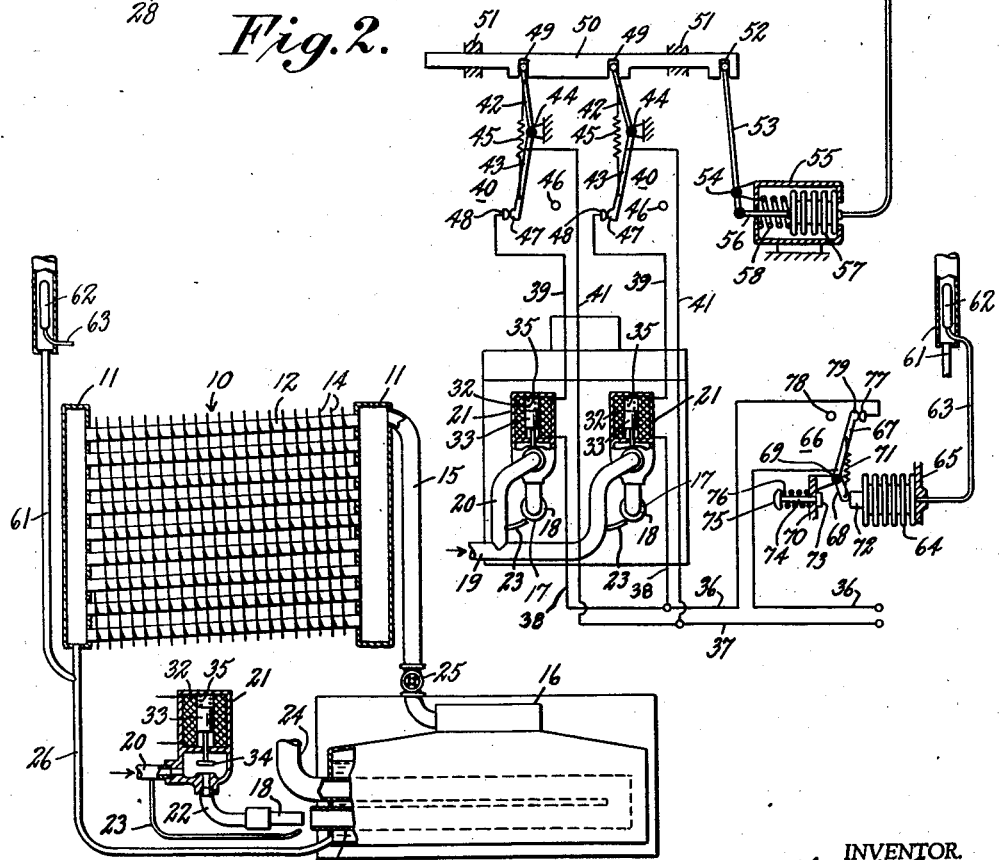

The invention, together with the above and other objects and advantages thereof, will be better understood from the following description taken in connection with the accompanying drawing forming a part of this specification, and of which:

Fig. 1 is a view more or less diagrammatically illustrating a heating system embodying the invention; and Fig. 2 diagrammatically illustrates an air conditioning system and control with which the heating system in Fig. 1 is associated.

Referring to Fig. 1, the heating system includes a heating element 10 having a plurality of spaced headers 11 arranged to receive the ends of a plurality of tubes 12. The tubes 12 are inclined slightly to the horizontal and are provided with a plurality of heat dissipating fins 14. Steam is supplied to the upper part of one of the headers 11 through a conduit 15 from a steam boiler 16.

The boiler 16 is provided with a plurality of fire or heating tubes 17 into the lower ends of which are adapted to project the flames produced by burners 18. A combustible fuel is delivered from a source of supply through a main conduit 19, branch conduits 20, control devices 21 to be described presently, and conduits 22 to the burners 18. Tubes 23 are connected to the branch conduits 20 and terminate in the vicinity of burners 18, whereby a pilot flame is provided for each burner when its associated control device 21 operates so that fuel will flow to the burner.

As shown most clearly in Fig. 2, the heating tubes 17 are arranged alongside each other and the burners are located at the front of the steam boiler 16. The upper end of each heating tube 17 joins a flue or riser 24 through which warm gases pass into the atmosphere from the boiler 16. A suitable hand control valve 25 is provided in conduit 15, so that manual control of steam flow to heating element 10 can be effected.

When valve 25 is opened and burners 18 are operating to supply heat to the boiler 16, steam is supplied to the upper part of one of the headers 11 through conduit 15. The steam entering the right-hand header 11 flows therefrom through the tubes 12 toward the other header, whereby a heating effect is produced by the heating element 10. The condensate formed in heating element 10 returns to the boiler 16 through a conduit 26.

The heating element 10 is arranged in a duct 27 of an air conditioning system, as shown in Fig. 2. The duct 27 is connected to a suitable blower 28, whereby air is withdrawn from an enclosure 29 through a duct 30 and passes in thermal exchange relation with heating element 10 in duct 27. The heating effect produced by heating element 10 is transmitted to the air, and the heated air flows through the blower 28 and a duct 31 from which the air is discharged into the enclosure 29.

As shown in Figs. 1 and 2, each of the control devices 21 includes a solenoid coil 32 formed to receive a plunger 33 to which is fixed a valve 34. When a solenoid coil 32 is electrically energized, the plunger 33 and valve 34 are raised against the force of gravity, whereby the valve 34 is moved to its open position so that fuel can flow from the conduit 20 past the valve into conduit 22 and thence to burners 18. When a solenoid coil 32 is de-energized, the plunger 33 and valve 34 fall by gravity, whereby the valve is moved to its closed position to shut off flow of fuel to the burner. Each control device is provided with a coil spring 35 to insure downward movement of plunger 33 by gravity when the solenoid coil 32 is de-energized.

As shown in Fig. 2, the solenoid coils 32 are connected to conductors 36 and 37 which are connected to a suitable source of electrical supply. One terminal of each coil is connected by a conductor 38 to the conductor 36, and the other terminal of each coil is connected by a conductor 39, switch 40 and conductor 41 to the conductor 37.

In accordance with this invention, the switches 40 are arranged to be controlled sequentially responsive to a temperature condition affected by the heating element 10. Any suitable mechanism may be employed to effect sequential control of switches 40, and I therefore do not wish to be limited to the particular arrangement illustrated and now to be described. As shown, the switches 40 are of the snap-action type and include toggle arms 42 and 43 pivoted at their inner ends at 44 to a suitable support, and a coil spring 45 connected to the outer ends of the arms.

Stops 46 are provided to limit movement of lower toggle arms 43 in one direction. When moved in the opposite direction the contacts 47 at the ends of toggle arms 43 cooperate with fixed contacts 48 to complete the circuits for the solenoid coils 32.

The upper ends of toggle arms 42 fit into recesses 49 formed in a slide bar 50 which passes through and is movable in suitable supports 51. The right-hand end of slide bar 50 is formed with a recess 52 to receive the upper end of a lever 53 which is pivoted intermediate its ends at 54 to a frame 55. The lower end of lever 53 is pivotally connected to a rod 56 which is secured to an expansible and contractible bellows 57 having one end thereof fixed and secured to the frame 55. A spring 58 is interposed between the bellows 57 and the left-hand end of frame 55.

The bellows 57 is connected by a capillary tube 59 to a thermal bulb 60 located in the enclosure 29. The bellows 57, tube 59 and bulb 60 constitute an expansible fluid thermostat containing a suitable volatile fluid which increases and decreases in volume with corresponding changes in temperature. The bellows 57 expands and contracts with increase and decrease in volume of the volatile fluid, and these movements of the bellows 57 are utilized to control the switches 40.

In Fig. 2 both of the switches 40 are closed and the solenoid coils 32 are energized, so that the valves 34 are in their open positions and fuel is supplied past the valves to the burners 18. The control just described is effective to sequentially control the devices 21, and hence control the flow of fuel to burners 18, so that the heating element 10 will be capable of maintaining the air in enclosure 29 at a desired temperature. When the air in enclosure 29, and hence the heating element 10, tends to rise above the desired temperature, the volatile fluid of the expansible fluid thermostat increases in volume and causes the bellows 57 to expand against the tension of coil spring 58. Expansion of bellows 57 imparts clockwise movement to lever 53 about pivot 54, whereby slide bar 50 is moved toward the right.

As the slide bar 50 is moved toward the right, the upper toggle arms 42 move clockwise about the pivots 44, and, when the coil springs 45 are moved past the straight line positions of the toggle arms 42 and 43, the lower toggle arms move with a snap-action toward the right and the contacts 47 and 48 are separated and the toggle arms 43 bear against the stops 46. The separation of contacts 47 and 48 opens the electrical circuits for the solenoid coils 32, whereby the valves 34 move to their closed positions to shut off flow of fuel to burners 18.

It will be noted in Fig. 2 that the upper toggle arms 42 of the switches 40 are at different angles with respect to the vertical. As slide bar 50 is moved toward the right, in the manner described above, the upper and lower toggle arms 42 and 43 of the left-hand switch 40 will come to a straight line position ahead of the toggle arms of the right hand switch. When this occurs and the coil spring 45 of the left-hand switch moves past the straight line position of the toggle arms, the lower toggle arm 43 will snap toward the right to separate contacts 47 and 48 and open the circuit for the left-hand control device 21.

It will be evident, therefore, that when the air tends to rise above the desired temperature in the enclosure 29, the movement of slide bar 50 toward the right, due to expansion of bellows 57, will first cause one of the burners 18 to become ineffective to heat boiler 16. With continued movement of slide bar 50 toward the right, the toggle arms 42 and 43 of the right-hand switch will reach a straight line position, and, when the coil spring 45 of this switch moves past the straight line position of the toggle arms, the lower toggle arm 43 will snap to the right to open the electrical circuit for the right-hand control device 21. With the burners 18 becoming ineffective to heat boiler 16, the production of steam is reduced whereby the heating effect produced by heating element 10 is also reduced. By first opening one switch 40 and then the other switch in the manner described above, the burners are controlled sequentially responsive to a temperature condition which is affected by heating element 10.

Conversely, when the air in the enclosure 29, and hence the heating element 10, tends to fall below the desired temperature, the volatile fluid of the expansible fluid thermostat decreases in volume and causes the bellows 57 to contract. Contraction of bellows 57 imparts counter-clockwise movement to lever 53, whereby slide bar 50 moves toward the left. Under these conditions the upper toggle arms 42 move counter-clockwise about the pivots 44, and, when the springs 45 have moved past the straight line positions of the toggle arms in the opposite direction from that described above, the lower toggle arms 43 move with a snap-action toward the left to close contacts 47 and 48. Closing of contacts 47 and 48 completes the electrical circuits for the solenoid coils 32, whereby the valves 34 are moved to their open positions to permit flow of fuel to the burners 18. By providing the pilot flame tubes 23, the burners 18 are immediately ignited with opening of the valves 34 so that hot gases will pass through the heating tubes 17 to heat the water in boiler 16 to produce steam. The steam produced by the boiler 16 due to heating by the burners 18 causes an increase in the heating effect produced by heating element 10 which is transmitted to air flowing through the duct 27 to the enclosure 29.

Assuming that both of the switches 40 are open, and that the slide bar 50 is moving toward the left due to contraction of the bellows 57, the right-hand switch 40 will close first to cause energization of the right-hand control device 21. With continued movement of slide bar 50 toward the left, the other switch 40 will be closed, whereby both of the control devices 21 will be energized and fuel will flow to both of the burners 18. However, the air in the enclosure 29 may tend to rise above the desired temperature such an amount as to cause only one of the switches 40 to close, so that only one of the burners will be effective to heat boiler 16.

In accordance with this invention the steam boiler system operates substantially at atmospheric pressure, so that self-regulation is effected of the effective heat dissipating surface of the heating element 10. This is accomplished by providing a steam vent 61 for heating element 10 which is connected to conduit 26 at the region where the latter is connected to one of the headers 11. By providing the vent 61, air can enter the interior of heating element 10 and blanket off part of the heat dissipating surface from direct contact by the steam at heat inputs less than maximum.

The steam boiler 16 is so proportioned and designed that, at maximum heat input to the steam boiler 16 by both of the burners 18, and with full load on the heating element 10 of a given capacity, all of the steam condenses in the heating element with practically no flow of steam through the vent 61 to atmosphere. The condensate formed in heating element 10 flows therefrom through conduit 26 to the boiler 16. With all the surfaces of tubes 12 heated by steam, maximum heating effect is obtained from heating element 10.

When the control described above has operated so that only one of the burners 18 is supplying heat to the steam boiler 16, the supply of steam to the heating element 10 is reduced. With the steam heating system operating substantially at atmospheric pressure due to the provision of the vent 61, the heating element at heat inputs less than maximum will only be partly filled with steam and the remainder of the heating element will contain air entering through vent 61. The quantity of air entering heating element 10 through vent 61 decreases and increases with changes in the heat input to boiler 16, so that more or less of the tubes 12 are blanketed off with air. In this way the effective heat dissipating surface of the heating element is varied and self-regulated, and such variation in the effective heat dissipating surface is proportional to the heat input to the steam boiler 16.

It should be understood that more than two burners 18 and control devices 21 can be employed, so that a more sensitive control of the heat input to the boiler and of the steam supply to heating element 10 can be effected. By providing more than two burners 18 to supply heat to steam boiler 16, therefore, the rate at which steam is supplied to heating element 10 can be controlled between even narrower limits than with the two burners illustrated.

In accordance with this invention, also, the supply of fuel to burners 18 is reduced when flow of steam occurs through vent 61 into the atmosphere. Flow of steam may occur through vent 61, for example, when the blower 28 in the duct system stops and there is loss of air circulation at a time when steam is being supplied to the heating element 10. This is accomplished by providing in the vent 61 a thermal bulb 62 which is connected by a capillary tube 63 to an expansible and contractible bellows 64 fixed at one end to a suitable support 65. The thermal bulb 62, tube 63 and bellows 64 contain a suitable volatile fluid and form an expansible fluid thermostat like that described above associated with switches 40. The movements of bellows 64 with increase and decrease in volume of the volatile fluid are utilized to control a switch 66 connected in the conductor 36. The switch 66 is similar to the switches 40 and includes toggle arms 67 and 68 pivoted at their inner ends at 69 to a bracket 70, and a coil spring 71 connected to the outer ends of the toggle arms. The lower toggle arm 68 is not connected to the bellows 64 and is located in the path of movement thereof. Opposite to a raised knob 72 on bellows 64 is provided a reset button 73. To the button 73 is secured a sleeve 74 which passes through an opening in bracket 70. The outer end of sleeve 74 is provided with an enlarged head 75 to receive a coil spring 76.

The upper toggle arm 67 is movable between a contact 77 and an insulated stop member 78, the contact 77 cooperating with a contact 79 at the end of the toggle arm. One part of the conductor 36 is connected to the inner end of toggle arm 67 which is insulated in any suitable manner from the pivot 69, and the other part of conductor 36 is connected to the contact 77.

During normal operation of the heating system, and when there is no flow of steam through vent conduit 61, the volume of the volatile fluid in the expansible fluid thermostat is reduced and the bellows 64 is in its contracted position. In such contracted position of bellows 64, the lower toggle arm 68 bears against the knob 72 and contacts 77 and 79 are closed to complete the circuits for the solenoid coils 32. Under these conditions the switches 40 associated with the normal control exercise influence over the solenoid coils 32 to control the flow of fuel to the burners 18.

When the flow of steam occurs through vent conduit 61, as when there is loss of load on heating element 10 due to operating failure of the blower 28, for example, the volume of the volatile fluid in the expansible fluid thermostat increases, whereby the bellows 64 expands. Expansion of bellows 64 imparts clockwise movement to lower toggle arm 68, and, when the coil spring 71 is moved past the straight line position of the toggle arms 67 and 68, both of the toggle arms move with a snap-action toward the left. With such snap-action the lower toggle arm 68 moves against the button 73, and the upper toggle arm 67 moves against the stop member 78. Operation of switch 66 in the manner just described separates contacts 77 and 79, whereby the circuit for the solenoid coils 32 is broken and the latter are de-energized. Under these conditions the plungers 34 of the control devices 21 move downward by gravity so that the valves 34 are moved to their closed positions to shut off flow of fuel to the burners.

In order to start flow of fuel to the burners 18 it is necessary to push the enlarged head 75 against the action of spring 76 to move the button 73 toward the bellows 64. This imparts counter-clockwise movement to lower toggle arm 68, and, when the coil spring 71 is moved past the straight position of the toggle arms in the opposite direction, the toggle arms move with a snap action toward the right. Assuming that there no longer is flow of steam through vent 61, the bellows 64 will be in the contracted position shown in Fig. 2, whereby the toggle arms can move to the position shown with the lower toggle arm 68 bearing against the knob 72 and the upper toggle arm closing the contacts 77 and 79. The closing of contacts 77 and 79 completes the circuit for the solenoid coils 32, whereby normal control of the solenoid coils by the switches 40 is resumed.

While a single embodiment of the invention has been shown and described, it will be apparent that modifications and changes may be made without departing from the spirit and scope of the invention, as pointed out in the following claims.

What is claimed is:

1. In an air conditioning unit, an enclosure, a duct connected to the enclosure, apparatus for causing flow of air through said duct to the enclosure, a boiler, a heater for heating said boiler to produce steam in the latter, heating means arranged in said duct connected to receive steam from said boiler, said heating means being vented to atmosphere, control means responsive to a temperature condition affected by said heating means for controlling said heater and hence the temperature of air in the enclosure, and means affected by flow of steam through said vent occasioned, for example, by loss of load on said heating means resulting through operating failure of said air flowing apparatus, to modify the control exercised by said control means and reduce the heating of said boiler by said heater.

2. A heating system comprising a plurality of parts including a boiler, a heater for heating said boiler to produce steam in the latter, a heating element connected to receive steam from said boiler, said heating element being unobstructedly vented to the atmosphere, the aforementioned parts of said system being so constructed and arranged that, at a predetermined maximum rate of heat input to said boiler by said heater and a predetermined load on said heating element, the steam supplied to said heating element fills the latter substantially completely with the steam condensing in said heating element and substantially no flow of steam through said vent, and means operative responsive to a temperature condition affected by said heating element to control said heater to reduce the heat input to said boiler below said definite rate and hence reduce the supply of steam to said heating element, so that air can enter the interior of the latter through said vent and blanket off part of the heat dissipating surface from the steam to reduce the heating effect of said heating element.

3. In an air conditioning unit, an enclosure, a duct connected to the enclosure, means for causing flow of air through said duct to the enclosure, an atmospheric pressure heating system comprising a plurality of parts including a boiler, a heater for heating said boiler to produce steam in the latter, heating means in said duct for transmitting heating effect to air flowing therethrough, said heating means being connected to receive steam from said boiler and being unobstructedly vented to atmosphere, the aforementioned parts of said heating system being so constructed and arranged that, for a predetermined maximum rate of heat input to said boiler by said heater and a predetermined load on said heating means, the steam supplied to said heating means fills the latter substantially completely with the steam condensing in said heating means and substantially no flow of steam through said vent, and means responsive to rise in a temperature condition affected by said heating means to control said heater to reduce the heat input to said boiler below the definite rate and hence reduce the supply of steam to said heating means, so that air from the atmosphere can pass through said vent and partly fill the interior of said heating means to blanket off a portion of the heat dissipating surface of the latter from the steam to reduce the heating effect of said heating means.

4. An atmospheric pressure heating system including a boiler, a heater for heating said boiler to produce steam in the latter, heating means connected to receive steam from said boiler, said heating means being vented so that air may pass into said heating means from atmosphere and steam may flow from said heating means to atmosphere, and means responsive to flow of steam through said vent from said heating means into the atmosphere to render said heater ineffective to heat said boiler.

5. An atmospheric pressure heating system including a boiler, a heater for heating said boiler to produce steam in the latter, a plurality of control devices for controlling flow of fuel to said heater, said control devices having valves capable of assuming only closed and fully opened positions, heating means connected to receive steam from said boiler, said heating means being vented to atmosphere, control means for selectively controlling said devices to regulate the flow of fuel to said heater and means responsive to flow of steam through said vent to render said control means inoperative to freely control said devices and cause said valves to assume their closed positions.

6. An atmospheric pressure heating system including a boiler, gas heating means for heating said boiler to produce steam in the latter, a plurality of valves each capable of assuming either a closed position or a fully open position for controlling flow of gas to said gas heating means, heating means connected to receive steam from said boiler, said heating means being vented to atmosphere, control means for sequentially controlling said valves to regulate flow of gas to said gas heating means and means responsive to flow of steam through said vent to render said control means ineffective to regulate flow of gas to said gas heating means and cause said valves to assume their closed positions.

7. An atmospheric pressure heating system as set forth in claim 6 in which said control means for sequentially controlling said valves operates responsive to a temperature condition affected by said heating element.

8. A heating system including a boiler, a heater for heating said boiler to produce steam in the latter, heating means having a vent and connected to receive steam from said boiler, means responsive to a temperature condition affected by said heating means for controlling said heater, and means operable to modify the control exercised by said control means and reduce the heating of said boiler by said heater when uncondensed steam passes through said vent from said heating means.

9. A heating system including a boiler, a heater for heating said boiler to produce steam in the latter, heating means having a vent and connected to receive steam from said boiler, control means responsive to a temperature condition affected by said heating means for normally controlling said heater, and means operable when uncondensed steam passes through said vent from said heating means to terminate normal control of said heater, said last-mentioned means being manually operable to permit normal control of said heater by said control means when uncondensed steam no longer passes through said vent from said heating means.

10. An atmospheric pressure heating system comprising a plurality of parts including a boiler having a heating tube, a fuel burner adapted to project its flame into said tube whereby hot gases pass through the latter to produce steam in said boiler, an electrical control device for controlling flow of fuel to said burner, heating means connected to receive steam from said boiler, said heating means being unobstructedly vented to atmosphere, and thermal means operative responsive to a temperature condition affected by said heating means for controlling said device, the aforementioned parts of said system and said thermal means being so constructed and arranged that, with a predetermined load on said heating means, said thermal means acts to cause predetermined maximum heating of said boiler by said heater so that said heating means will be substantially filled with steam and all of the steam will condense therein with practically no steam passing through said vent to the atmosphere.

11. A heating system including a boiler, a heater for heating said boiler to produce steam in the latter, heating means unobstructedly vented to atmosphere and connected to receive steam from said boiler, control means operative responsive to a temperature condition affected by said heating means for controlling said heater, and safety means operative responsive to the presence of steam in the unobstructed vent to modify the control exercised by said control means to turn the heater off when steam flows through said vent.

12. The combination of heating means providing a chamber having a heat transfer surface, said chamber having means for admitting heating vapor thereto and draining condensate therefrom, a vent conduit connected to said chamber at a point remote from the region at which heating vapor is admitted thereto, said vent conduit being located so that condensate formed in said chamber normally cannot flow therethrough, means to supply heating vapor to said chamber so that heating vapor flows in contact with said heat transfer surface toward said vent conduit from the region at which heating vapor is admitted to said chamber, said vent conduit providing a passage through which heating vapor may pass from said chamber into the presence of a non-heating medium at substantially constant pressure, such as atmospheric air, and through which non-heating medium may pass into said chamber when the latter is not completely filled with heating vapor, control means responsive to a temperature condition affected by said heating means for controlling said supply means to regulate the rate at which heating vapor is supplied to said chamber, said non-heating medium being displaced from said chamber through said vent conduit upon increase in quantity of heating vapor in said chamber and said non-heating medium entering said chamber through said vent conduit upon decrease in quantity of heating vapor in said chamber, the quantity of heating vapor in contact with said heat transfer surface being dependent upon the quantity of heating vapor in said chamber with respect to the quantity of non-heating medium therein, and means responsive solely to the presence of heating vapor in said vent conduit to modify the control of said supply means by said control means.

ALBERT R. THOMAS.